Patented Apr. 28, 1953

2,636,811

UNITED STATES PATENT OFFICE 2,636,811

PROCESS FOR STABILIZING RED PHOSPHORUS

George F. Nordblom, Philadelphia, Pa.

No Drawing. Application March 13, 1945, Serial No. 582,479

10 Claims. (Cl. 23—223)

(Granted under Title 35, U. S. Code (1952), sec. 266)

The invention described herein may be manufactured and used by or for the Government for governmental purposes, without the payment to me of any royalty thereon.

The present invention is concerned with enhancing the resistance of red phosphorus to oxidation.

More particularly the invention is concerned with increasing the resistance of red phosphorus to oxidation when stored or kept for long periods of time either as such or in admixture with solid oxidizing agents, such as barium nitrate, lead peroxide, basic lead nitrate and other oxidizing agents, in the form of primers or priming compositions for small arms, pyrotechnic compositions, incendiary compositions and other inflammable compositions.

When the ordinary forms of pulverulent red phosphorus now appearing on the market are mixed with solid oxidizing agents in the preparation of primer, incendiary, pyrotechnic and other inflammable compositions, the stability of the prepared compositions on storage under various conditions of humidity and temperature is not entirely satisfactory. The red phosphorus undergoes partial oxidation, whereby acids containing phosphorus in their negative radicals are formed.

As pointed out in my co-pending application Serial No. 519,950, filed January 27, 1944, jointly with Martin S. Silverstein, small amounts of iron and copper in red phosphorus adversely affect the storage stability of primer, pyrotechnic, incendiary and other inflammable compositions containing red phosphorus. Copper or copper compounds in red phosphorus or iron compounds in red phosphorus, even though present in small amounts, act as oxidation catalysts or accelerators of oxidation of the red phosphorus under storage conditions as well as under test conditions with warm water moist air at atmospheric pressure, and under test conditions with water moist warm oxygen under superatmospheric pressure.

Analyses of many samples of pulverulent red phosphorus sold on the market, and from various sources of supply, have revealed that they all contained iron and copper, that the iron content varied roughly from 200 to 700 parts of iron (calculated as Fe) per million parts of red phosphorus, and that the copper content may vary from 10 to 40 parts of copper (calculated as Cu) per million parts of red phosphorus.

Among the objects of the inventions described in my above mentioned joint application for patent with Martin S. Silverstein, was the provision of a process for quickly and effectively removing iron from red phosphorus whose iron content is undesirably high. In contrast to this stated object, the object of the present invention is provision of a process for quickly and effectively removing either copper or copper and iron from red phosphorus, whereby its resistance to oxidation during storage under varying conditions of temperature and humidity is enhanced.

The treatment of red phosphorus to remove copper described in the present application may precede or follow the acid treatments described in my said joint application with Martin S. Silverstein, whereby both the iron and copper content may be lowered.

Although the process of the present application is mostly concerned with the removal of copper from pulverulent red phosphorus containing it in undesirable amounts, the process of removal of copper is also accompanied by some considerable removal of iron from red phosphorus, thus, for example, an iron content of 92 parts per million of red phosphorus may be brought down to 37 parts of iron per million parts of red phosphorus.

In general, the process of the present invention comprises intimately contacting pulverulent red phosphorus containing copper or copper and iron with a hot aqueous solution of an alkali metal cyanide, for example sodium cyanide or potassium cyanide. The concentration of the alkali metal cyanide solution may vary within wide limits from very dilute solutions to saturated solutions. A water solution of sodium cyanide containing from 2 to 25 per cent sodium cyanide may be employed. An 8 per cent water solution of sodium cyanide at the boiling point of the solution has been found to give excellent results in the removal of copper from red phosphorus containing from 10 to 40 parts of copper per million parts of red phosphorus. The intimate contact between the red phosphorus and the cyanide solution is brought about advantageously by agitating or vigorously stirring the solution containing the red phosphorus under treatment. When the solution is employed at the boiling temperature, the agitation due to boiling is usually sufficient. When, however, the cyanide solution is employed at a temperature below the boiling point, intimate contact between the red phosphorus particles and the cyanide solution is attained by vigorous stirring or agitation of the solution.

The temperature of the cyanide solution during the treatment of the red phosphorus therewith may vary within wide limits, for example it may range from 50° C. to the boiling point of the solution at atmospheric pressure. The treatment of the red phosphorus with the cyanide solution may be performed at temperatures above the boiling point of the solution at atmospheric pressure by conducting the contact between the red phosphorus and the cyanide solution under pressures above atmospheric pressure accompanied by agitation of the red phosphorus in the solution to bring about intimate contact between the red phosphorus and the solution. As a general rule, the rate of removal of the copper from the red phosphorus is directly proportional to the temperature of the cyanide solution, and the concentration of the cyanide solution.

To the aqueous solution of alkali metal cyanide used in the process there may be added a sufficient amount of alkali metal hydroxide to appreciably reduce hydrolysis of the cyanide, whereby the liberation of hydrocyanic acid from the hot or boiling solution is prevented or reduced. Thus, the hydrolysis of a water solution of sodium cyanide may be retarded or arrested by the addition of sodium hydroxide to the solution.

The following specific examples are illustrative of the manner of practicing the invention.

*Example I*

Pulverulent red phosphorus appearing now on the market and containing more than 99 per cent of phosphorus after washing and drying, but still containing small quantities of iron and copper, was subjected to a sedimentation or separating operation to remove particles of less than 10 microns in diameter. The particles of red phosphorus of 10 microns and above were collected and dried and constituted the starting material for this and succeeding examples. This starting material contained more than 99 per cent red phosphorus, but there was also contained in it 92 parts of iron (calculated as Fe) per million parts of red phosphorus and 14 parts of copper (calculated as Cu) per million parts of red phosphorus.

Three hundred grams of an 8.0 per cent water solution of sodium cyanide were heated to boiling. To the boiling solution of sodium cyanide there were added 100 grams of the red phosphorus starting material described above. The red phosphorus was added to the boiling solution at such a rate that the solution continued to boil during the additions of the whole amount of red phosphorus. By proceeding in this manner, the agitation of the red phosphorus in the solution continued during the time required to add the red phosphorus to the solution. After all of the 100 grams of red phosphorus were added to the cyanide solution, the boiling of the solution was continued for thirty minutes. The heat applied in producing the boiling was sufficient to produce boiling at such a rate that the red phosphorus was thoroughly and continually agitated in the cyanide solution.

After this treatment described above the red phosphorus was decanted from the sodium cyanide solution, suspended in water, and filtered and washed on a Buchner funnel. When this wet red phosphorus was dried in a vacuum oven at 60° C., and analysed for iron and copper, it was found to contain 37 parts of iron (calculated as Fe) per million parts of red phosphorus and 3.2 parts of copper (calculated as Cu) per million parts of red phosphorus. By comparing this analysis with the analysis of the starting material, it will be observed that the copper content of the red phosphorus was reduced and that also a portion of the iron content has been removed.

*Example II*

In this example the procedure was the same as in Example I above, except that a 20 per cent water solution of sodium cyanide was used instead of the 8.0 per cent water solution of sodium cyanide described in Example I, and the boiling of the 20 per cent sodium cyanide solution containing the red phosphorus was continued for four hours after all the phosphorus had been added to the solution. The treated red phosphorus obtained according to this example contained less than one half part of copper (calculated as Cu) per million parts of red phosphorus.

*Example III*

Red phosphorus treated according to Example I above and containing 37 parts of iron and 3.2 parts of copper per million parts of red phosphorus was subject to intimate contact and agitation with a dilute water solution of a mineral acid according to the process described in the above mentioned joint application for patent. The mineral acid may be sulphuric, hydrochloric, nitric or phosphoric acid. Either the wet or dry final product of Example I may be used as the starting material of this example.

The red phosphorus starting material was mixed with a 10 per cent water solution of sulphuric acid in the ratio of one gram of red phosphorus to 5 milliliters of sulphuric acid solution. The mixture was brought to boiling and the boiling continued for one hour. The boiling of the solution agitated the red phosphorus in the solution. The mixture was then diluted to twice its volume with cold water, filtered and washed with water on the filter until free of acid. The washed and filtered red phosphorus was then dried in a vacuum oven at 60° C. The dried treated red phosphorus contained only 2.5 parts of iron per million parts of red phosphorus and 3.2 parts of copper per million parts of red phosphorus.

I claim:

1. Process for preparing red phosphorus of increased resistance to oxidation from red phosphorus containing copper impurities, said process comprising intimately contacting the said impure red phosphorus with an aqueous solution of alkali metal cyanide for removing copper from the said red phosphorus, thereafter washing the red phosphorus to remove the cyanide solution and metal cyanide complexes therefrom, and thereafter drying the thus purified and more stable red phosphorus.

2. Process for preparing red phosphorus of increased resistance to oxidation from red phosphorus containing copper impurities in the order of ten to forty parts of copper per million parts of phosphorus, said process comprising the lowering of the copper content to the order of one to three parts per million parts of phosphorus by intimately contacting the said red phosphorus with a hot aqueous solution of an alkali metal cyanide, thereafter washing the red phosphorus to remove the cyanide solution and metal cyanide complexes therefrom, and thereafter drying the thus purified and more stable red phosphorus.

3. Process for preparing red phosphorus of increased resistance to oxidation from red phosphorus containing copper impurities, in the order of ten to forty parts of copper per million parts of phosphorus, said process comprising the lowering of the copper content to the order of one to three parts per million parts of phosphorus by intimately contacting the said red phosphorus with a boiling aqueous solution of an alkali metal cyanide, thereafter washing the red phosphorus with water to remove the cyanide solution and metal cyanide complexes therefrom, and thereafter drying the thus purified and more stable red phosphorus.

4. Process for preparing red phosphorus of increased resistance to oxidation from red phosphorus containing copper impurities, said process comprising intimately contacting the said red phosphorus with an aqueous solution containing an alkali metal cyanide and an alkali metal hydroxide, thereafter washing the red phosphorus with water to remove the cyanide and alkali metal hydroxide solutions therefrom, and thereafter drying the thus purified and more stable red phosphorus.

5. Process for preparing red phosphorus of increased resistance to oxidation from red phosphorus containing copper impurities, said process comprising intimately contacting the said red phosphorus with an aqueous solution of an alkali metal cyanide, washing with water to remove the metal cyanide complexes, then intimately contacting said red phosphorus with an aqueous solution of a mineral acid, thereafter washing the red phosphorus with water to remove the mineral acid and acid soluble salts therefrom, and thereafter drying the thus purified and more stable red phosphorus.

6. Process for preparing red phosphorus of increased resistance to oxidation from red phosphorus containing copper impurities, said process comprising intimately contacting the said red phorphorus with an aqueous solution of a mineral acid, washing with water to remove the acid and acid-soluble salts, then intimately contacting said red phosphorus with an aqueous solution of an alkali metal cyanide, thereafter washing the red phosphorus with water to remove the metal cyanide complexes therefrom, and thereafter drying the thus purified and more stable red phosphorus.

7. Process for preparing red phosphorus of increased resistance to oxidation from red phosphorus containing copper impurities, in the order of ten to forty parts of copper per million parts of phosphorus, said process comprising the lowering of the copper content to the order of one to three parts per million parts of phosphorus by intimately contacting the said red phosphorus with a hot aqueous solution of an alkali metal cyanide, washing with water to remove the metal cyanide complexes, then intimately contacting said red phosphorus with a hot aqueous solution of a mineral acid, thereafter washing the red phosphorus with water to remove the mineral acid and acid soluble salts therefrom, and thereafter drying the thus purified and more stable red phosphorus.

8. Process for preparing red phosphorus of increased resistance to oxidation from red phosphorus containing copper impurities, in the order of ten to forty parts of copper per million parts of phosphorus, said process comprising the lowering of the copper content to the order of one to three parts per million parts of phosphorus by intimately contacting the said red phosphorus with a hot aqueous solution of a mineral acid, washing with water to remove the acid and acid-soluble salts, then intimately contacting said red phosphorus with a hot aqueous solution of an alkali metal cyanide, thereafter washing the red phosphorus with water to remove the metal cyanide complexes therefrom, and thereafter drying the thus purified and more stable red phosphorus.

9. In the art of preparing compositions of matter containing red phosphorus utilizing as a starting material red phosphorus which contains in the order of ten to forty parts of copper per million parts of phosphorus, the method which comprises the lowering of the copper content to the order of one to three parts per million parts of phosphorus by treating said red phosphorus with alkali metal cyanide solution, then washing the red phosphorus with water to remove the cyanide solution and metal cyanide complexes therefrom, thereafter drying the red phosphorus, and thereafter incorporating said red phosphorus of lowered copper content into a composition of matter as an ingredient thereof.

10. In the art of preparing compositions of matter containing red phosphorus utilizing as a starting material red phosphorus which contains in the order of ten to forty parts of copper per million parts of phosphorus, the method which comprises the lowering of the copper content to the order of one to three parts per million parts of phosphorus by treating said red phosphorus with an aqueous solution of an alkali metal cyanide and an alkali metal hydroxide, then washing the red phosphorus with water to remove the cyanide solution and metal cyanide complexes therefrom, thereafter drying the red phosphorus, and thereafter incorporating said red phosphorus of lowered copper content into a composition of matter as an ingredient thereof.

GEORGE F. NORDBLOM.

References Cited in the file of this patent

UNITED STATES PATENTS

| Number | Name | Date |
|---|---|---|
| 1,178,081 | Layng | Apr. 4, 1916 |

OTHER REFERENCES

Mellor, "Comprehensive Treatise on Inorganic and Theoretical Chemistry," vol. 8, 1928, pp. 743, 745; Longmans, Green and Co., New York, N. Y.

Thorpe's "Dictionary of Applied Chemistry," Fourth Ed., vol. III, 1939, pp. 485, 486; Longmans, Green and Co., New York, N. Y.